(12) United States Patent
Guma

(10) Patent No.: US 11,584,210 B1
(45) Date of Patent: Feb. 21, 2023

(54) PORTABLE AUTOMATIC VEHICLE CANOPY

(71) Applicant: Tesfa Guma, Ananadale, VA (US)

(72) Inventor: Tesfa Guma, Ananadale, VA (US)

( * ) Notice: Subject to any disclaimer, the term of this patent is extended or adjusted under 35 U.S.C. 154(b) by 0 days.

(21) Appl. No.: 17/300,041

(22) Filed: Feb. 23, 2021

Related U.S. Application Data

(62) Division of application No. 15/932,655, filed on Apr. 4, 2018, now Pat. No. 10,981,440.

(60) Provisional application No. 62/601,967, filed on Apr. 6, 2017.

(51) Int. Cl.
*B60J 11/04* (2006.01)

(52) U.S. Cl.
CPC .................................... *B60J 11/04* (2013.01)

(58) Field of Classification Search
CPC ....................................................... B60J 11/04
USPC ............................................................ 150/166
See application file for complete search history.

(56) References Cited

U.S. PATENT DOCUMENTS

| | | | | |
|---|---|---|---|---|
| 4,432,581 A * | 2/1984 | Guma | ...................... | B60J 11/02 |
| | | | | 296/136.03 |
| 4,727,898 A * | 3/1988 | Guma | ...................... | B60J 11/02 |
| | | | | 296/136.03 |
| 2018/0290528 A1 * | 10/2018 | Guma | ...................... | B60J 11/04 |
| 2018/0290529 A1 * | 10/2018 | Ching | ...................... | B60J 11/04 |

* cited by examiner

*Primary Examiner* — Sue A Weaver
(74) *Attorney, Agent, or Firm* — Neifeld IP Law PLLC

(57) ABSTRACT

The invention provides an improved cover for a vehicle, which includes a frame and a hinge, so that the cover can be unfolded to substantially cover the vehicle and folds back into a storage position.

5 Claims, 8 Drawing Sheets

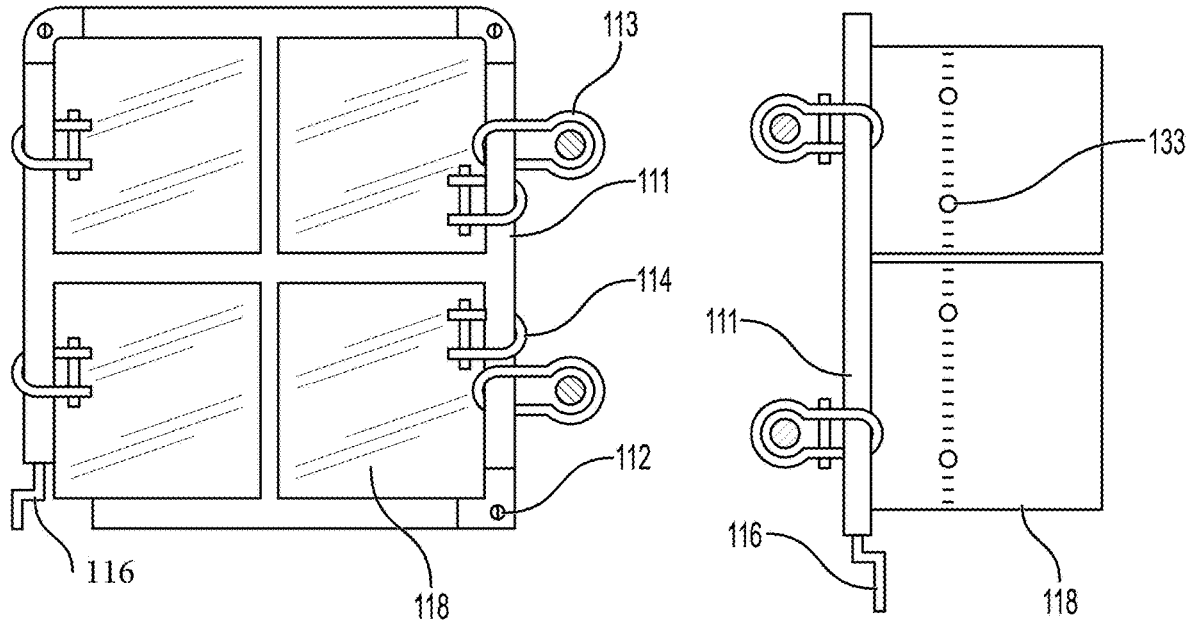
FIG. 4    FIG. 5
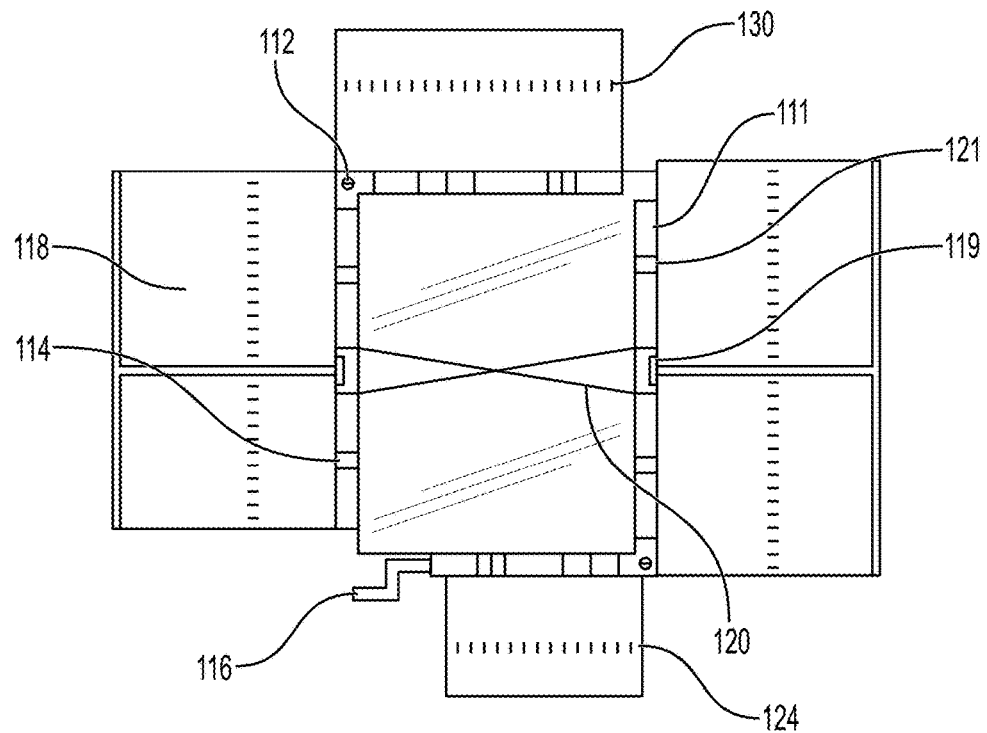
FIG. 6

# PORTABLE AUTOMATIC VEHICLE CANOPY

CROSS-REFERENCE TO RELATED APPLICATIONS

This application is a divisional of U.S. Nonprovisional patent application Ser. No. 15/932,655 filed Apr. 4, 2018, which claims the benefit of U.S. Provisional Application Ser. No. 62/601,967, filed Apr. 6, 2017 the contents of both of which are herein incorporated by reference in its entirety.

BACKGROUND OF THE INVENTION

1. Field of the Invention

The present invention relates to covers. More specifically, the present invention relates to those covers which can automatically and effortlessly be unfolded from a storage position to provide protection for vehicles of all kinds and other properties which require protection against the element. It teaches a simple method of protecting a vehicle anywhere, at all times, without the need for expensive covered garage.

SUMMARY OF THE INVENTION

The present invention overcomes the problems identified above by providing cover flaps which automatically unfold from a storage position on top of the vehicle and extend out to cover the outside surface of the vehicle such as the side widows, the front and back windshields, and the front and rear hoods of the vehicle and fold back into a storage position when not in deployment. The cover includes elongated plurality of rotatable round frames positioned on the peripheral area of the top of the vehicle similar to roof racks and rails, with cover flaps hinged to the said frames. The hinging, which can also be spring hinge type, is such that it can be loose to allow each cover flap to be manipulated one by one. When the snow or other debris on the cover is too heavy to manipulate all the cover flaps at the same time, the hinging is loosened and the cover flaps are manipulated one by one. Otherwise, the hinges are tightened to the frames to enable automatic manipulation of the whole cover flap system at the same time by turning the rotatable round frames. The manipulation is facilitated by attachment of handles to the frames at only one corner of the vehicle, enabling the owner, especially the handicapped, to cover the property from one position only, thus avoiding the strenuous inconvenience of having to move around the vehicle.

Separate layer of flat cover flaps are provided to cover the roof of the vehicle and hinged to the said frames. To get rid of debris on the roof of the vehicle, these roof covers are lifted and swung open and turned to the side of the vehicle thus dropping off the debris away from the sides of the vehicle. To return the whole cover system into storage position, the process is reversed and the flat roof cover is first folded back to lay on the roof of the vehicle before the cover flaps for the sides and hoods are folded for storage. When the cover flaps are in folded and storage position, they will automatically lay flat one on top of the other. The stored cover flaps are secured in storage position by security bar and latch mechanism which snaps into position, to prevent flailing dangerously especially when the vehicle is in motion.

This arrangement provides numerous advantages. The cover protects the object being covered from direct exposure to the sun's rays. As a result, it reduces the effects of uncomfortably hot temperature to which a vehicle's interior typically rises during the summer, causing child death when left in the searing heat inside the car. Both the interior and exterior of the vehicle can be protected from the damaging effects of the sun, such as scorching, fading, discoloration and wear, resulting in lower maintenance costs, longer car life, enhanced resale value as well as reducing the need to purchase new car. In the same regard, energy is conserved by reducing the need for air conditioning. The finish is protected from hail, rain and mud rain, thus reducing color fading. It also reduces the time, human energy and money normally spent on washing and polishing the vehicle. The effortless and convenient easy manipulation of the cover with the push of a button or a lever, while standing at one spot near the vehicle helps the unwell, and the disabled drivers to protect and enjoy the comfort of their automobile. The owner does not need to build expensive car garage next to his residence. The new invention protects the car, so protectively covered, to be parked anywhere, at all time, without the need for expensive covered garage.

BRIEF DESCRIPTION OF THE DRAWING

These and other objects and advantages of the present invention will become more apparent and more readily appreciated from the following detailed description of the presently preferred exemplary embodiment of the invention taken in conjunction with the accompanying drawing, of which:

FIG. 4 is an assembly of round rotatable frames as connected and engaged at three corners by means of angle gear system fitted with only one manipulation handle, and cover flaps hinged to the frames.

FIG. 5 is a sample of assembly of cover flaps as hinged on to a rotatable round frame which is further fitted with the brackets for installation on to vehicle roof rack.

FIG. 6 is another view of FIG. 4 above further fitted with endless cross chains and gearing sprockets installed so as to engage opposite round frames; and cover flaps unfolded and installed on the round rotatable frames.

DETAILED DESCRIPTION OF THE PRESENTLY PREFERRED EMBODIMENT

Figure 1:
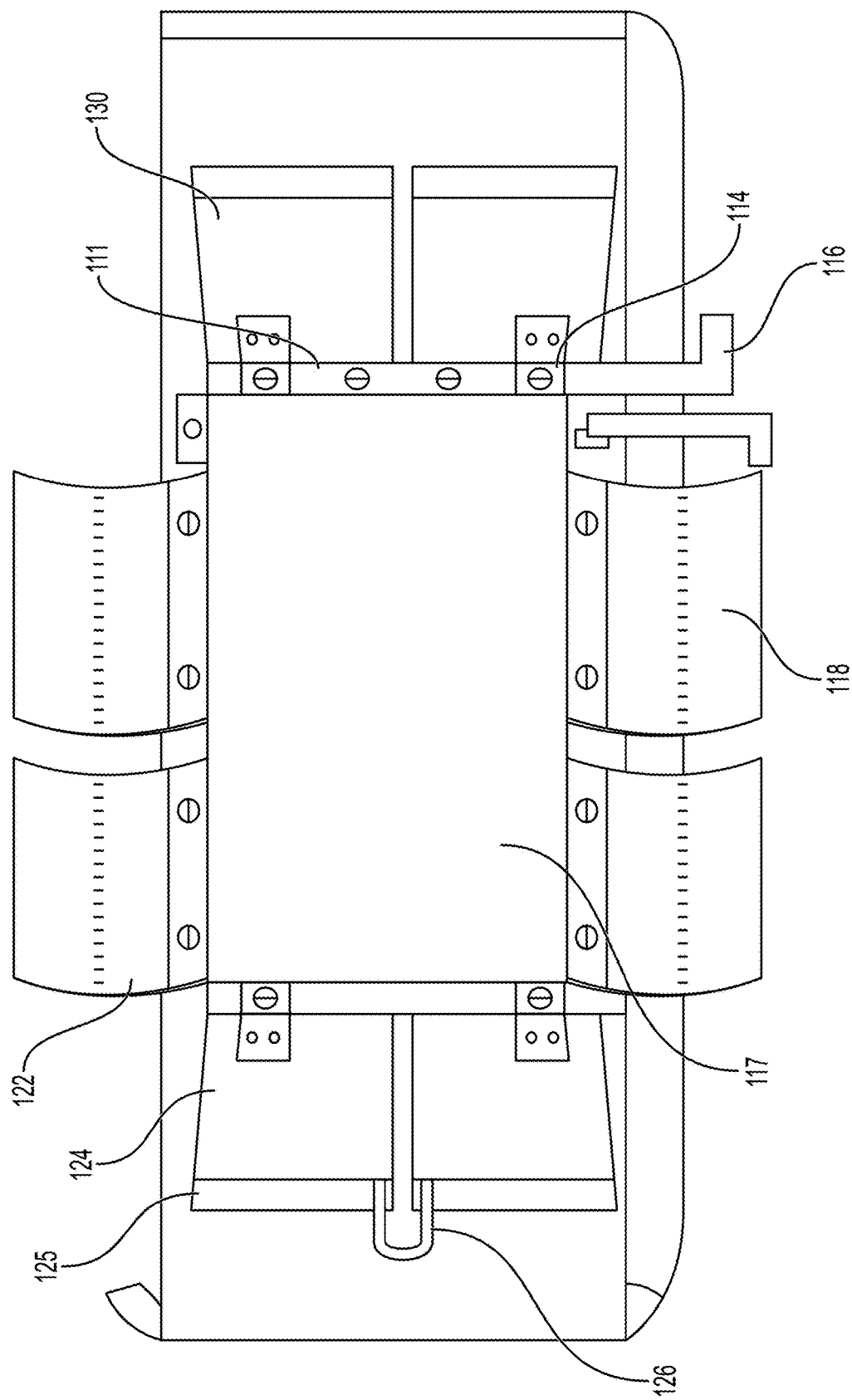
FIG. 1 is a perspective view of the cover system as assembled, installed and deployed on a vehicle.
Figure 2:
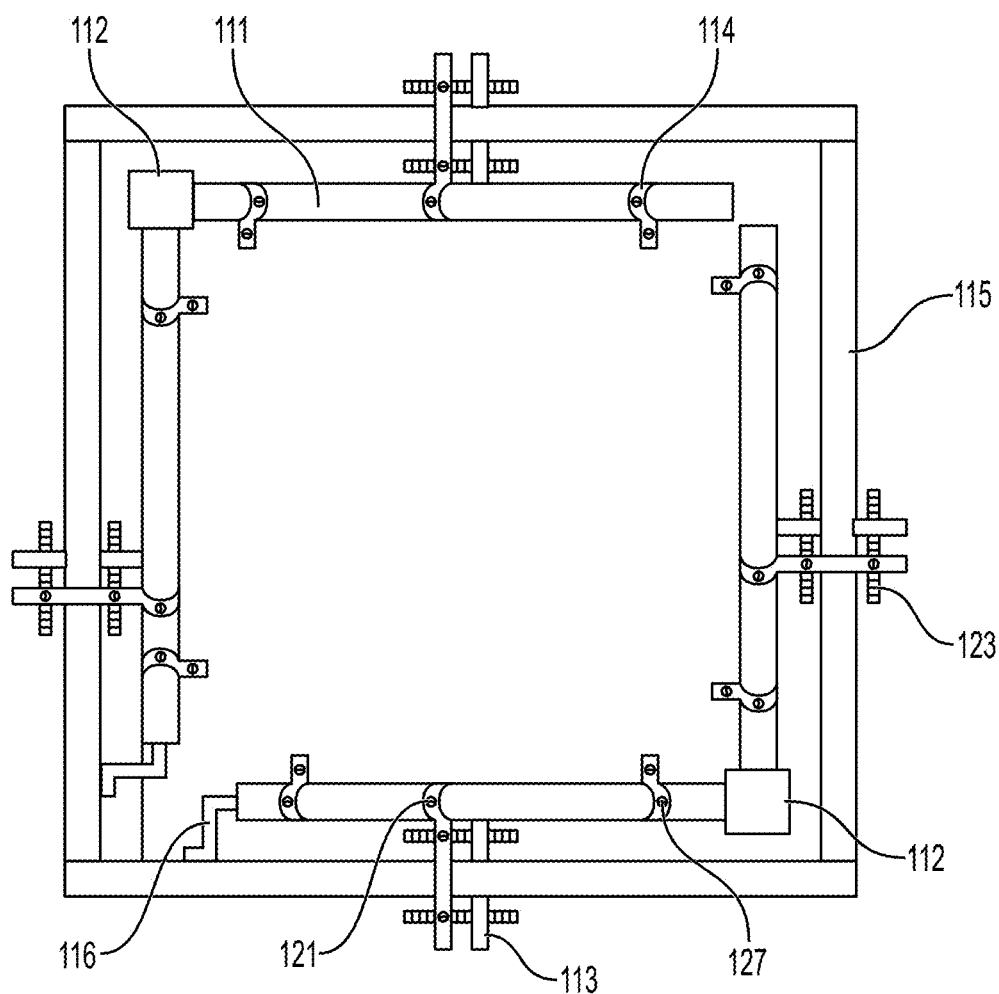
FIG. 2 is a plan view of the assembly of this invention with elongated round rotatable frames engaged at two ends with angle gearing system and installed and fastened to the roof rack frames of a vehicle.

As illustrated in FIGS. 1 and 2, plurality of elongated rotatable round frames 111 are positioned so as to form a generally rectangular shape on a flat surface such as the roof 117 of a vehicle. The rotatable round frames are engaged at corners with angle gears 112. Alternatively, engaging the ends only at opposite corners is easier and preferred. The gearing system makes the turning of the adjoined rotatable round frames to turn simultaneously when manually forced to turn by means of handles 116.

As illustrated in FIG. 6, it is possible to achieve the same objective of simultaneously turning the frames by installing sprockets 119 on the rotatable frames 111 and engaging the sprockets 119 with endless cross chains 120. This arrangement enables the frames to turn in opposite directions when manipulated to do so.

As illustrated in FIGS. 5 and 6, cover flaps 118 are disposed each with one side edge adjacent to the elongated rotatable frames 111.

Figure 7:
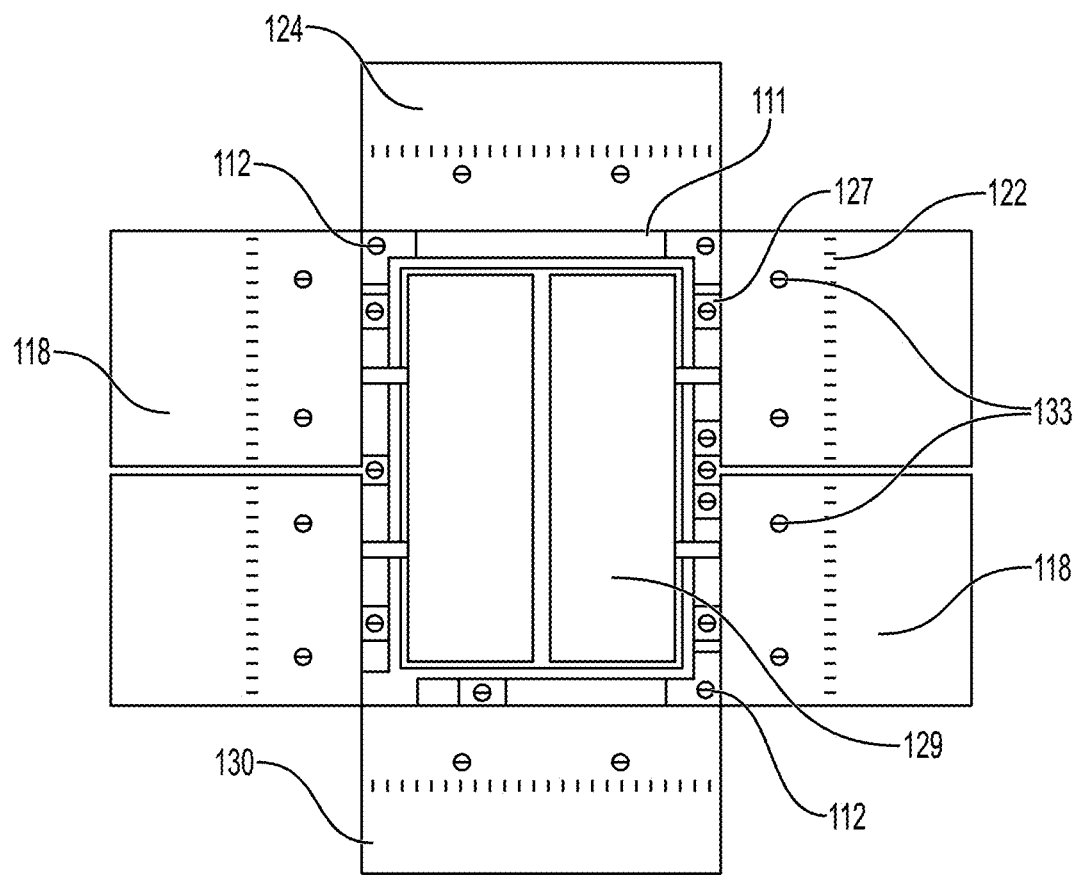
FIG. 7 is a plan view of a complete assembly of the cover system, with extension and folding hinges, including cover flaps for side windows, front and rear wind shields and cover for the roof of a vehicle.
Figure 9:
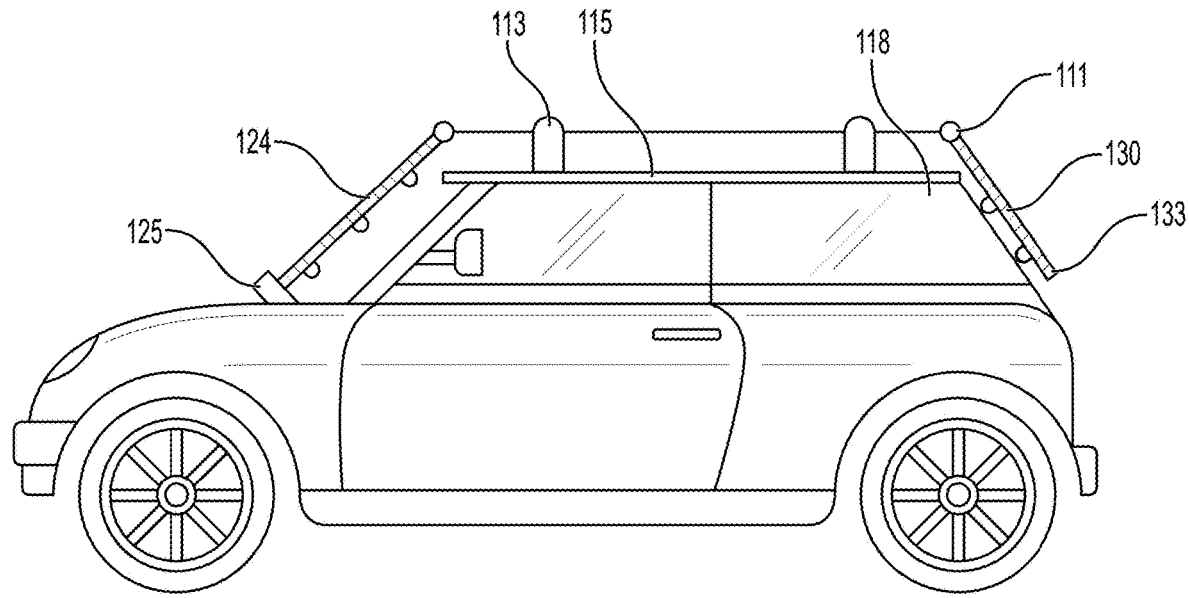
FIG. 9 is a side-view of a vehicle showing the cover flaps covering one side window and end views of the cover flaps for the front and rear wind shields.

FIGS. 5, 7, and 9 also shows spacers 133.

As best illustrated in FIGS. 1, 2, 3, and 6 the said rotatable frames 111 are fitted with hinging means 114 which are used to hinge cover flaps 118 for side windows, cover flap 124 for front windshield and cover flap 130 for rear windshield, to the said elongated rotatable round frames. The said hinging means are made to tighten and loosen as necessary, by screw means 127. When the screws are tight, it enables the cover visor flaps to turn along with the rotatable round frames. When the frames are forced to turn, the arrangement enables the cover system to cover or uncover the windows and windshields of the vehicle The loosening of the screws 127 makes it possible to turn the visors only, one by one, especially when the debris on the flaps is too heavy to turn the flaps all together.

Figure 3:
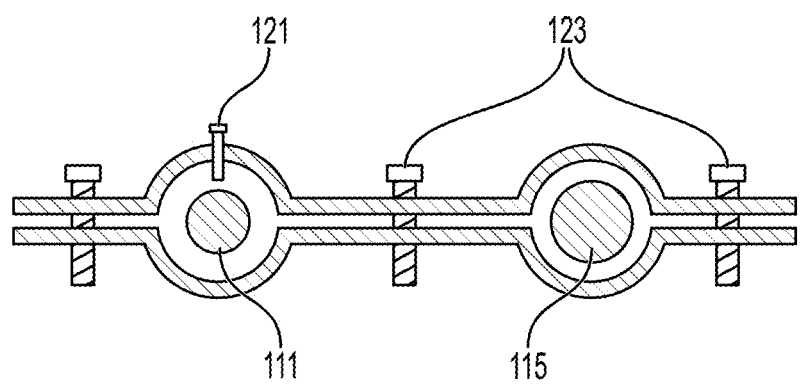
FIG. 3 is a side end view of assembly of a bracket system to be deployed when installing the cover system onto vehicle roof rack.

As best illustrated in FIGS. 3 and 4, Bracket 113 is deployed to install rotatable frames 111 and the cover system to vehicle roof rack 115 by means of bracket bolts 123.

As illustrated in FIG. 2, 3, frame rotation control screw 127 is deployed to control rotation of the frames 111. It is to tighten or loosen the fastening between installation bracket 113 and frames 111. When the frame rotation control screw is loose it allows the frames to turn, and along with it, the turning of the cover flaps. When the control screw is tightened it impedes the turning of the frames and along with it, the turning of the cover flaps. To manipulate the cover flaps one by one, it is necessary to loosen the screw 127 of the cover flap. This latter alternative step for manipulation of the cover flap is necessary when the debris on the visor flaps is too heavy, requiring the turning of the cover flaps one by one; a helpful strategy for those who do not have the necessary energy.

FIGS. 2, 3 also show bolt 121 associated with frames 111.

As best illustrated in FIGS. 6, and 9, front windshield 24 is fitted with retainer bar 125 which is configured to accommodate security latch 28. The combination of both the latch and the retainer bar is designed to securely hold the front windshield cover in place both during deployment and when in storage positions.

As best illustrated in FIGS. 3 and 4, installation bracket 113 is deployed to install the assembly of the cover system on the vehicle roof rack 115 by means of bracket bolt 123. The installation bracket is designed to adapt onto different sizes of roof racks. Alternatively, the assembly of frames 111 can first be installed on the roof rack by means of bracket 113 and bolt 123; and then the cover flaps 118, 124 and 130 can be hinged onto respective round rod frames 111.

As best illustrated in FIG. 7, cover flaps 118 are fitted with extension and folding hinges 122. The hinges are to increase and extend the size of the flaps to cover more surface. The hinges also facilitate easy folding into compact size when the flaps are to be returned into storage form.

Roof cover flaps 129 are disposed and hinged to round rod frame 111. This additional component is to supplement the function of full protective coverage for the vehicle. It is loosely hinged to the round rod frame 111 for easy unfolding one by one to throw off the debris to the side of the vehicle and returned to its permanent flat position to cover the roof of the vehicle. All the hinging mechanism indicated above can be of spring hinging type. Spacers 133 can be disposed on all cover flaps on the surface which touches the vehicle surface to maintain air space so that the covers do not scratch the vehicle surface.

Figure 8:
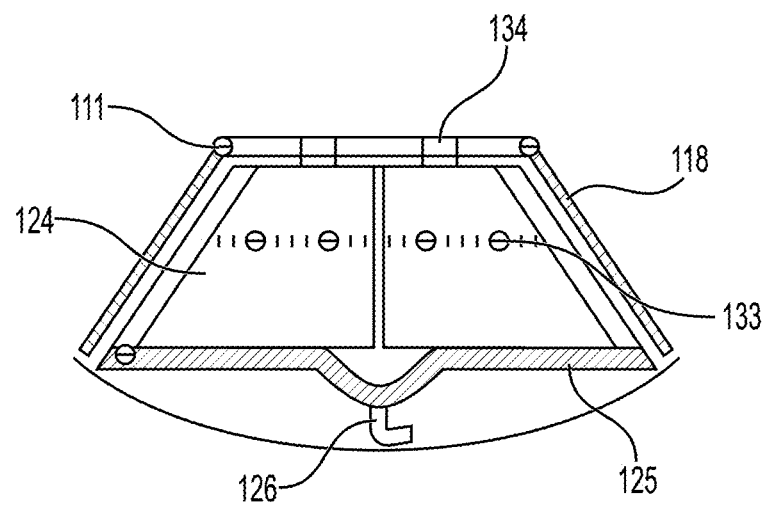
FIG. 8 is a plan view of the present invention showing the cover flap for the front wind shield, the front end views of the side window covers and cover retention bar and latch system.

As best illustrated in FIG. 8, front windshield cover 124 is disposed in place and hinged to rotatable round frame 111. It is fitted with cover retention security bar 125 which is configured to accommodate security latch hook 126.

As illustrated in FIG. 9, the cover system is shown as deployed to cover one side window, front windshield and rear windshield.

Figure 10:
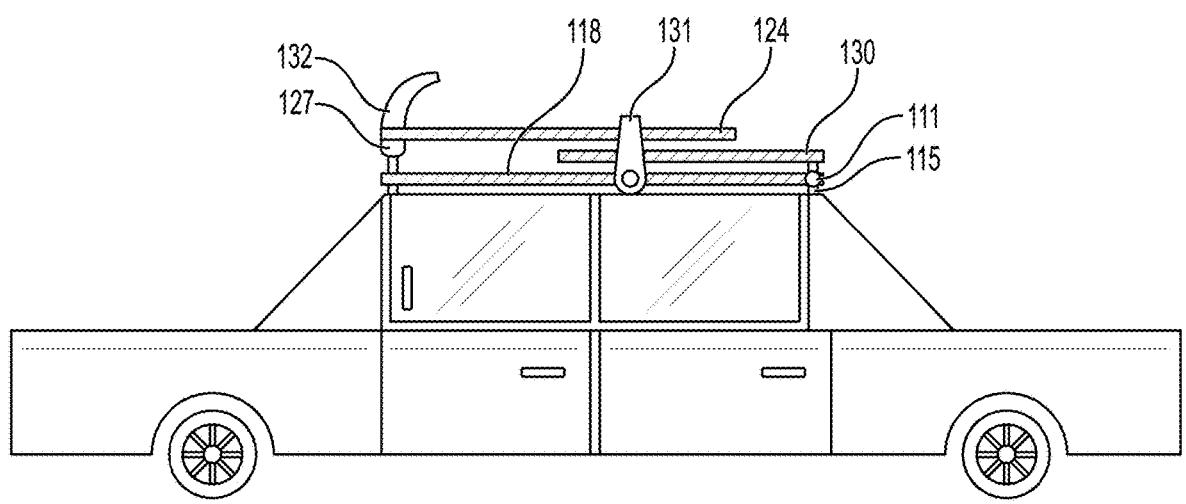
FIG. 10 is a side end view of the cover flaps folded up into a storage position on top of a vehicle.
Figure 11:
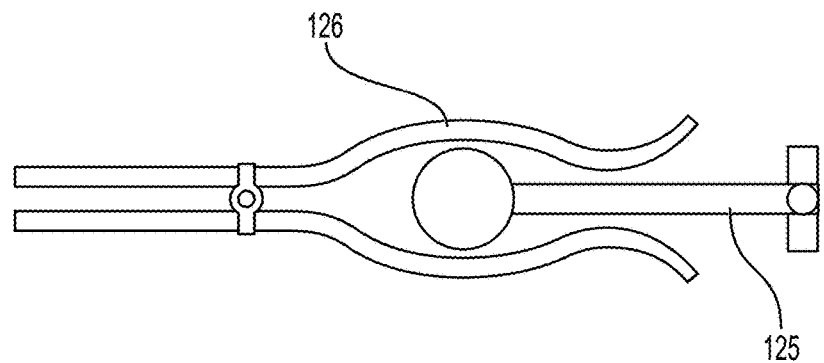
FIG. 11 is a plan view of a exemplary security retention latch system for the cover flaps of the presently preferred embodiment of this invention.
Figure 12:
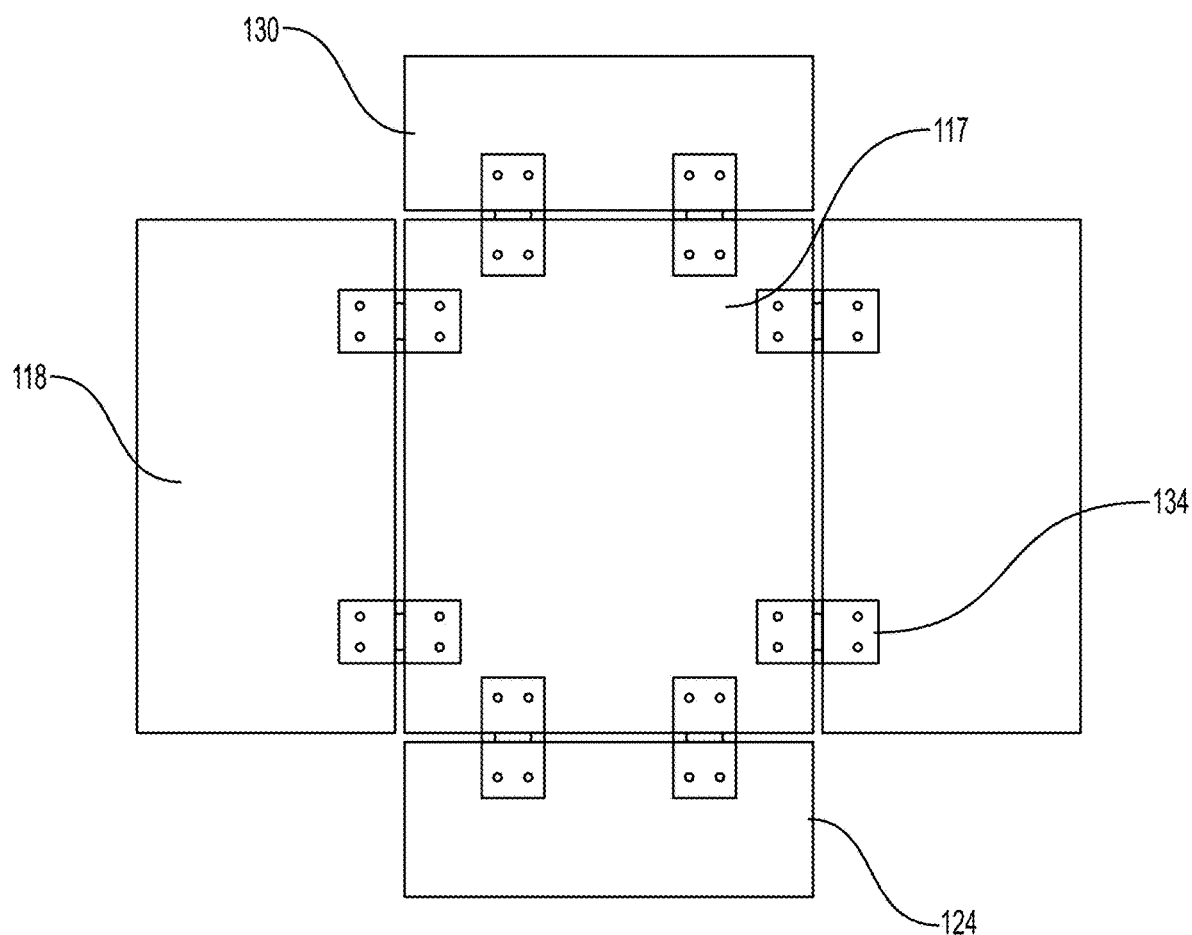
FIG. 12 is a plan view of an embodiment including cover flaps 118, 124, 130, and clamps 134, on roof 117.
Figure 13:
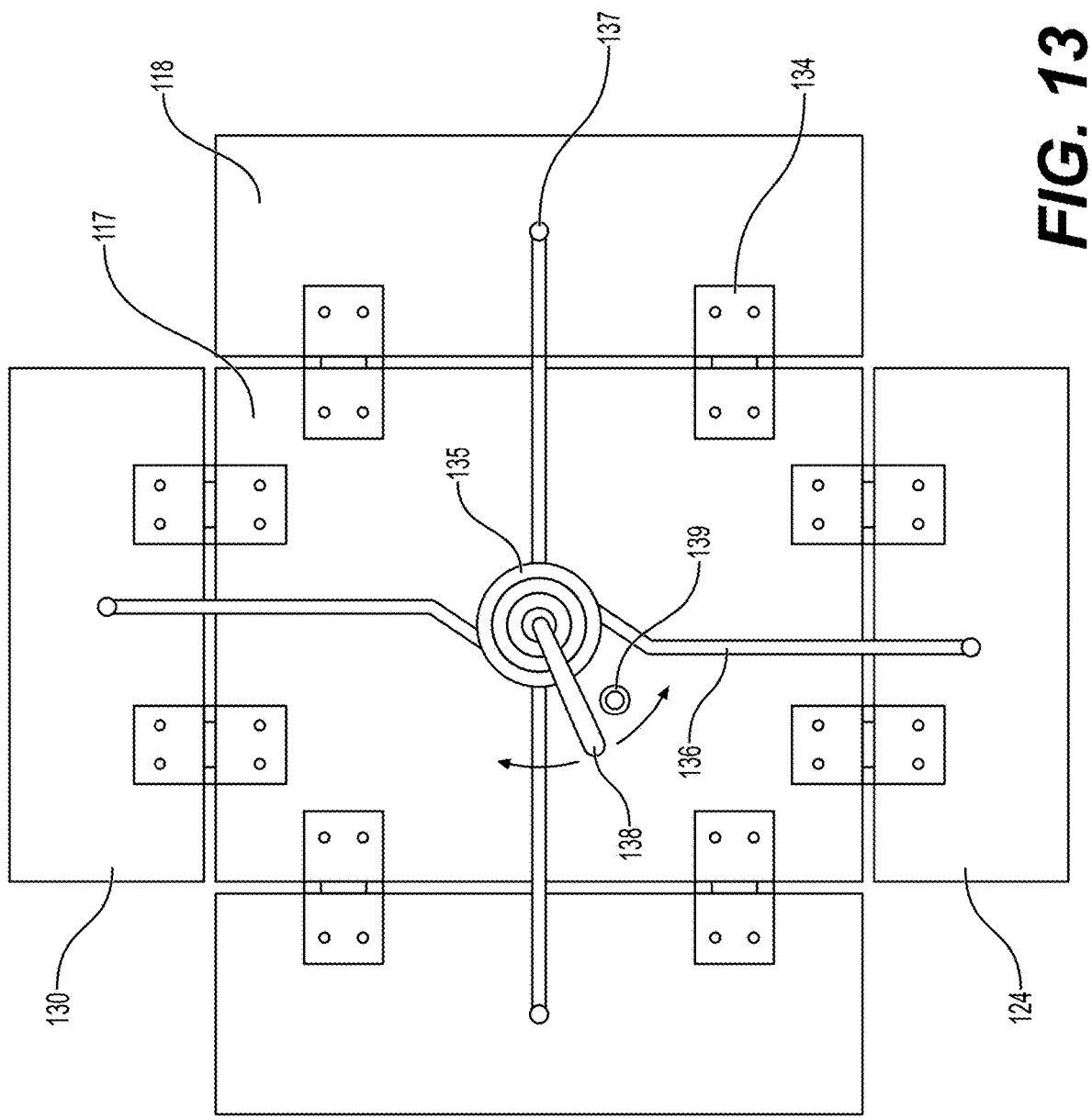
FIG. 13 is a plan view of an embodiment including cover flaps 118, 124, 130, and additional elements 135, 136, 137, 138, and 139, on roof 117.
Figure 14:
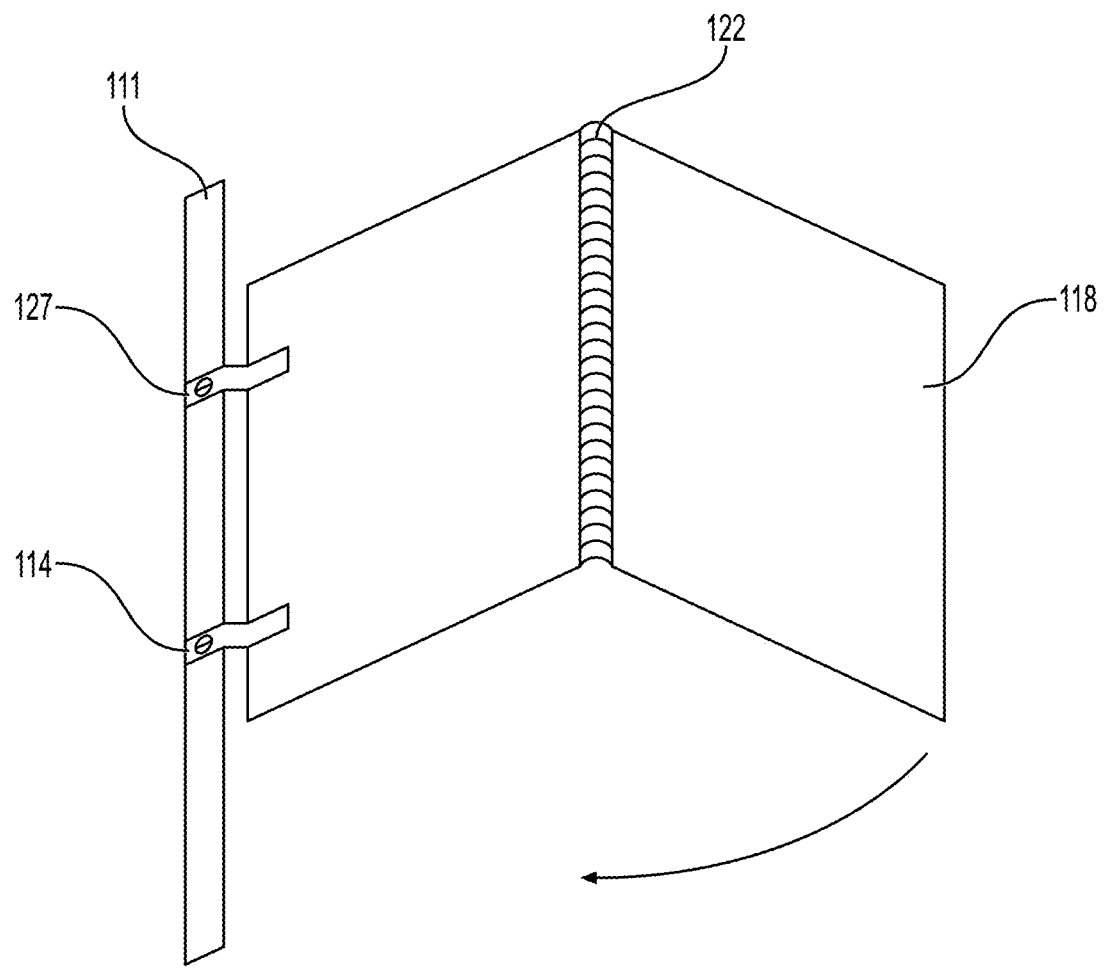
FIG. 14 is a perspective view of an assembly comprising hinging means 114, cover flap 118, folding hinges 122, and screw means 127.
Figure 15:
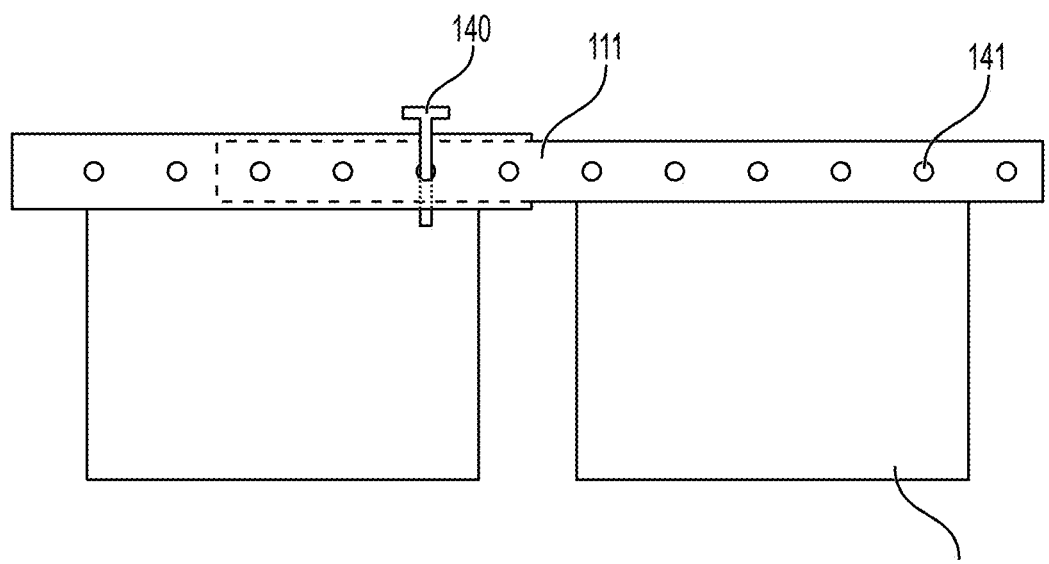
FIG. 15 is a perspective view of an assembly comprising rotatable round frames 111, cover flaps 118, and additional elements 140 and 141.

As best illustrated in FIG. 10, the cover system with flaps for all mentioned surfaces is shown in storage position on top of a vehicle depicting the proper sequential manipulation steps. Wind break 132 is also provided to supplement security of folded front windshield against flailing especially when the vehicle is motion.

As illustrated in FIGS. 1, 9, and 10, exemplary security system is shown with security latch hook 131 disposed in engaged position with the security bar 125 of front windshield cover.

The process of deployment of portable automatic vehicle canopy as detailed above has to follow pre-set sequence during manipulation. The process is to ensure proper function while in deployment and secure storage against dangerous flailing while in storage position, especially during the movement of the vehicle.

First, to deploy for coverage, the security latch is disengaged; Second, the cover section for the front windshield is unfolded from storage position toward covering the said surface; Third, the cover for the rear windshield is unfolded and extended out to cover the rear windshield. Fourth, the covers for side windows are unfolded and extended out to cover the side windows.

This along with the above described embodiment of this presently preferred invention completes and meets all the objectives and benefits of this invention by providing complete protective cover for a vehicle, making it deployable at all times, and in all places; Although only a few exemplary embodiments of this invention have been described in detail above, those skilled in the art would readily appreciate that many modifications are possible In the exemplary embodiments without materially departing from the novel teachings and advantages of this invention. Accordingly, all such modifications are intended to be included within the scope of this application as defined in the following claims.

The invention claimed is:

1. A cover for a vehicle, said vehicle having a vehicle passenger compartment and a vehicle outer surface, said vehicle outer surface comprising a first side surface, a second side surface, a front windshield surface, a rear windshield surface, a front hood surface, a rear hood surface, and a roof surface, said cover comprising:
   a plurality of cover sheets;
   a plurality of first hinges;
   said plurality of first hinges are spring loaded hinges;
   wherein said plurality of first hinges are configured to urge said plurality of cover sheets to a covering position in which said plurality of sheets cover portions of said vehicle outer surface;
   a handle and a rotatable frame, wherein the handle is connected to the rotatable frame, and the plurality of cover sheets are hinged to the rotatable frame, wherein said handle, said rotatable frame, and said plurality of cover sheets are configured to move said plurality of cover sheets to cover or uncover said portions of said vehicle outer surface when force is applied to said handle;
   wherein one of said plurality of cover sheets comprises a first cover sheet section and a second cover sheet section positioned adjacently to one another;
   a plurality of second hinges;
   wherein said plurality of second hinges comprise a second hinge that fastens to said first cover sheet section and to said second cover sheet section;
   wherein said second hinge, said first cover sheet, and said second cover sheet are configured to allow said first cover sheet and said second cover sheet to unfold;
   a plurality of spacers;
   wherein said plurality of spacers are disposed on said plurality of cover sheets;
   wherein said plurality of spacers are configured to limit the minimum space between said plurality of cover sheets and said outer surface.

2. The cover of claim 1, further comprising a wind break configured to be disposed across the top area of said front windshield surface.

3. The cover of claim 1, further comprising a secure-locking-device deployed to secure said cover on said vehicle against unwanted removal.

4. The cover of claim 1, further comprising a cover retention security bar connected to the rotatable frame, and a security latch hook connected to the cover retention security bar.

5. The cover of claim 1, further comprising a roof cover sheet configured to selectively cover and uncover a portion of said roof surface.

* * * * *